US005174378A

United States Patent [19]

Costerton et al.

[11] Patent Number: 5,174,378
[45] Date of Patent: Dec. 29, 1992

[54] MICROBIAL MANIPULATIONS OF SURFACTANT-CONTAINING FOAMS TO REDUCE SUBTERRANEAN FORMATION PERMEABILITY

[75] Inventors: John W. F. Costerton; Francene Cusack; Theodore J. Cyr; Sandra A. Blenkinsopp; Carol P. Anderson, all of Alberta, Canada

[73] Assignee: Alberta Oil Sands Technology and Research Authority, Edmonton, Canada

[21] Appl. No.: 767,320

[22] Filed: Sep. 30, 1991

[30] Foreign Application Priority Data

Sep. 28, 1990 [GB] United Kingdom ............. 9021114

[51] Int. Cl.⁵ ................. E02D 31/00; E21B 33/138; E21B 43/22
[52] U.S. Cl. .................. 166/246; 166/294; 166/309; 405/128; 405/264; 405/266; 405/267; 435/281
[58] Field of Search ......... 166/246, 294, 309; 405/128, 264, 266, 267; 435/248, 249, 281

[56] References Cited

U.S. PATENT DOCUMENTS

| | | | |
|---|---|---|---|
| 1,753,641 | 4/1930 | Beckman | 435/281 |
| 1,998,756 | 4/1936 | Grebe et al. | 166/246 |
| 3,547,199 | 12/1970 | Froning et al. | 166/309 X |
| 3,598,181 | 8/1971 | Wegner et al. | 166/246 |
| 3,893,511 | 7/1975 | Root | 166/309 X |
| 4,558,739 | 12/1985 | McInerney et al. | 166/246 |
| 4,799,545 | 1/1989 | Silver et al. | 166/246 |
| 4,800,959 | 1/1989 | Costerton et al. | 166/246 |
| 4,818,406 | 4/1989 | Sawchuk et al. | 435/281 X |

Primary Examiner—George A. Suchfield
Attorney, Agent, or Firm—Millen, White, Zelano and Branigan

[57] ABSTRACT

A microbial system is provided for selective plugging of permeable regions of a subterranean formation, for use in conjunction with injection of surfactant-containing foams. Bacteria indigenous to the target formation are isolated, and selected for ability to degrade the surfactant of interest. Small, non-adherent ultramicrobacteria, or UMB, are prepared from the selected culture by starvation. The UMB and the surfactant-containing foam are then injected into the target formation. The surfactant allows the foam to penetrate into the formation. The UMB then revive to their vegetative state, degrade the surfactant and produce exopolymer, thus plugging the formation.

15 Claims, 4 Drawing Sheets

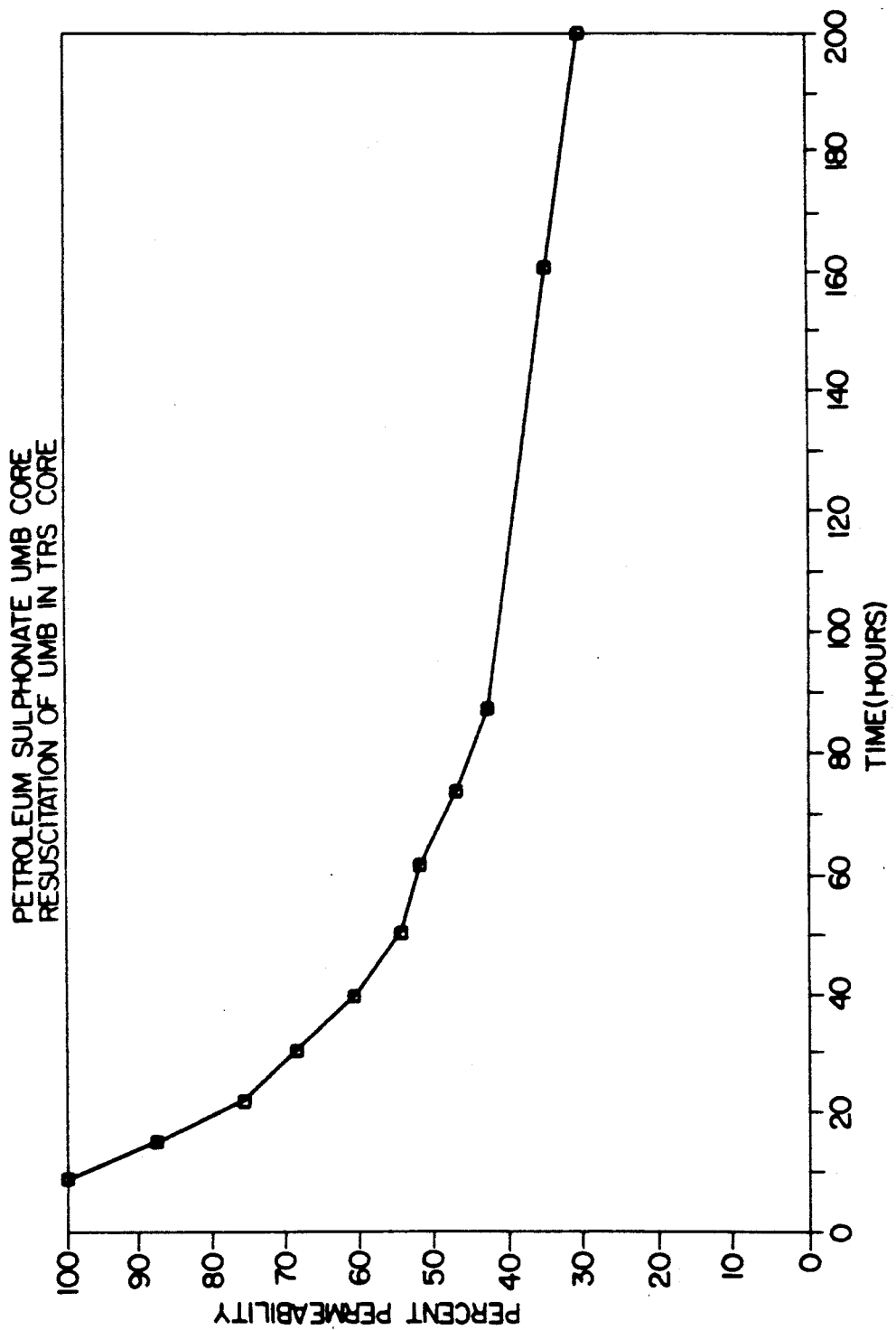

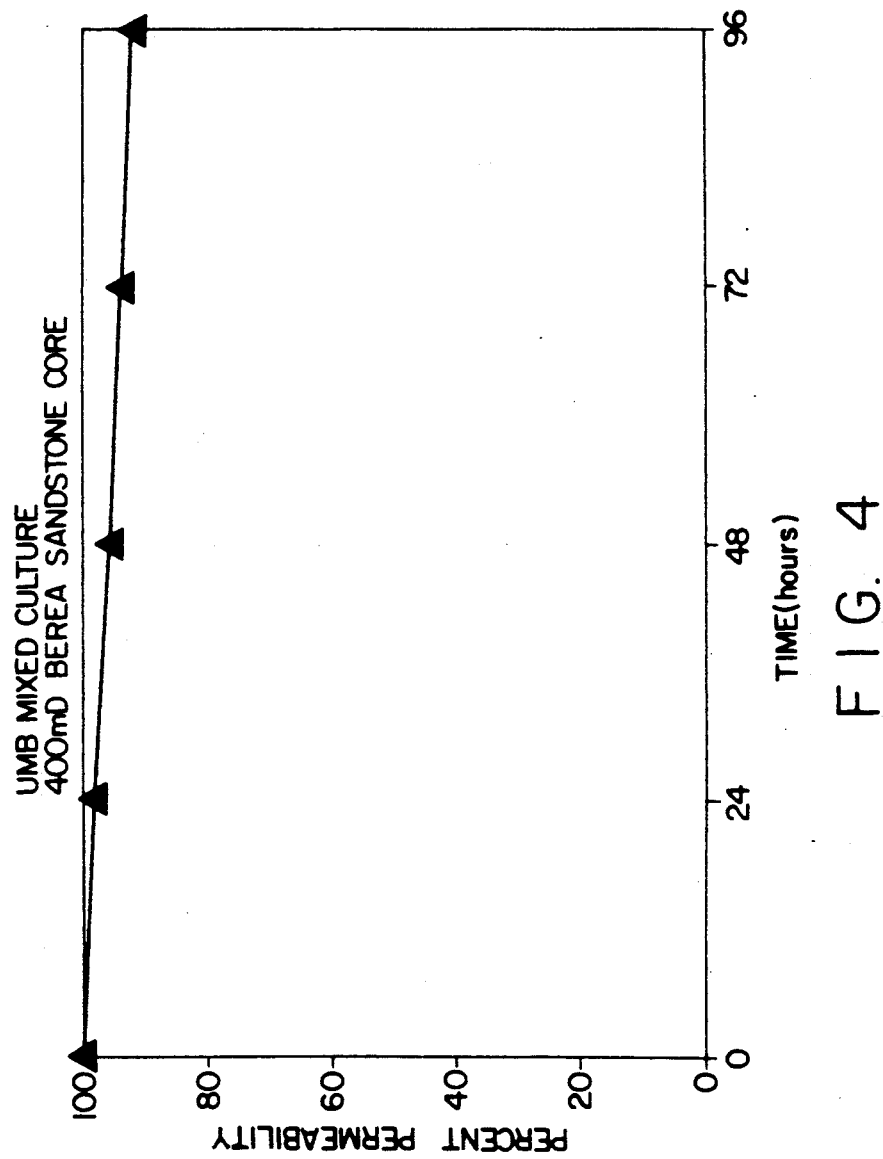

MICROBIAL MANIPULATIONS OF SURFACTANT-CONTAINING FOAMS TO REDUCE SUBTERRANEAN FORMATION PERMEABILITY

FIELD OF THE INVENTION

The present invention relates to a microbial system for plugging permeable strata in a formation, through microbial degradation of surfactants contained in injected foams. It also relates to preparation of surfactant degrading bacterial strains, and ultramicrobacteria therefrom, for use in this system.

BACKGROUND OF THE INVENTION

Reduction of permeability in subterranean formations is desirable in a number of fields.

In the oil industry, in the course of some secondary oil recovery operations, water is injected through an injection well to sweep or drive oil toward an adjacent production well. A serious problem that can arise in such an operation is that the water preferentially moves through permeable strata in the formation and bypasses oil contained in less permeable strata. This narrowly focused water movement is commonly referred to as "fingering". As a result of fingering, the sweep efficiency of many water-swept operations fall far short of what is sought.

Another water movement problem associated with oil recovery operations is referred to as "coning". When an oil well is being produced, water present in a stratum underlying the oil zone can "cone" upwardly and enter the well bore. As the difference in viscosity between the oil and water is usually significant the water tends to move more easily through the rock or sand matrix adjacent the well bore. As a result, this flow of water excludes the oil from the well bore.

Because of these problems, there is an ongoing search in the oil industry for an effective means for preventing the movement of water or displacement fluids through permeable zones or strata associated with an oil reservoir.

In addition, reducing formation permeability is also desirable in other areas. These include to prevent seepage of salt water or waste to water supplies, or of water from water-retaining structures.

Methods have been developed, particularly in the oil industry, to reduce formation permeability. However, they entail a number of problems.

One method in the prior art involved the injection of surfactant-containing foams into the target formation. Such foams are normally formed using an inert gas, a surfactant, and a liquid. They may be injected as a preformed foam, or by sequential injections of surfactant solution and gas. The surfactant causes the surface tension of the foam bubbles to drop, so that the foam can easily penetrate the permeable zones in the formation. The problem with the use of such foams is that the foam remains unstable and is therefore mobile or readily displaceable. Thus it may be displaced by water or displacement fluids used in attempting to produce the well.

Another method is disclosed in U.S. Pat. No. 4,800,959 entitled "Microbial Process for Selectively Plugging a Subterranean Formation". This patent noted that laboratory studies have shown that bacterial expolysaccharides that coalesce to form a confluent biofilm can be used to effectively seal a simulated reservoir matrix or core formed of fused glass beads (as disclosed in "Bacterial Fouling in a Model Core System", J. C. Shaw et al, (1985) Applied and Environmental Microbiology, p. 693–701). However, if vegetative cells are used, "skin plugging" occurs—a build-up of thick biofilm at the injection point. U.S. Pat. No. 4,558,739 issued to McInerney et al sought to eliminate this problem by injection of bacterial spores, which are metabolically inert and non-adhesive in nature. However, problems remained—of size constraints, as the spores are still of 1 $\mu$m in diameter; only a few types of bacteria produce spores; and specific nutrients are necessary to return the spores to the vegetative state. Those problems were attacked in U.S. Pat. No. 4,800,959, by use of ultramicrobacteria, or UMB.

UMB are produced by certain bacterial strains in a low-nutrient environment. Under such a starvation regime, the cells undergo significant reductions in cell size and morphological transformations during progressive cell divisions, to form the reduced-size cells known as UMB. The diameter of UMB range from about 0.2 $\mu$m to about 0.4 $\mu$m. In the absence of nutrient, UMB do not adhere readily to a sand matrix such as found in a reservoir.

U.S. Pat. No. 4,800,959 disclosed injecting UMB into the formation, followed by a specific nutrient controlled solution to resuscitate the UMB to the vegetative state. The revived cells then produce biofilm to plug the formation. Preferably the UMB were formed by isolating the bacterial class indigenous to oil reservoir waters, such as *Pseudomonas putida* or a Klebsiella species and subjecting them to a starvation regime.

One of the problems with using UMB as disclosed in this patent, is that the plugging of the formation depends on the continued existence of the biofilm. Another problem is that there is a significant time lag before plugging takes place, as the plug does not form until the UMB resuscitate and the cells produce exopolymer.

SUMMARY OF THE INVENTION

The present invention provides a system to plug a permeable stratum in a formation without the problems noted above associated with the prior art.

According to the present invention:

UMB which are competent to degrade a surfactant upon resuscitation to the vegetative state under stratum conditions are injected into the stratum; and a foam containing the surfactant is injected into the stratum;

such that the UMB resuscitate to the vegetative state, and degrade the surfactant to effectively plug the stratum.

The surfactant allows the foam to deeply penetrate the permeable zones by reducing the surface tension of the bubbles. The foam provides an initial plug. After it is in place, the UMB resuscitate or revive to their vegetative state. This revival, or induction period, may take some time as the bacteria adapt to the nutrients and environment. The length of the induction period may be manipulated by adjusting formation conditions, such as salinity, or by injection of additional nutrients. The cells resuscitate by degrading the surfactant, which raises the surface tension of the foam bubbles. This renders the foam less displaceable and provides a long-lasting plug to reduce the permeability of the formation.

One aspect of the invention relates to preparation of the surfactant-competent bacteria, and UMB therefrom.

First of all, bacteria which can degrade a particular surfactant are selected. One way this may be done is by cultivation in a recirculating perfusion column in which the surfactant in question is the only organic nutrient. Once enrichment has taken place, those micro-organisms that have developed the capacity to degrade the surfactant are isolated, for instance by the spread plate technique. Surfactant-degrading isolates are then assessed for their ability to form UMB, through starvation of their cells. "Starvation" is achieved by placement of the bacteria in a carbon-free environment, such as a phosphate buffer salts solution (PBS), for at least two weeks. Facultative cultures, which may grow both in the presence and absence of oxygen, are preferred.

Another aspect of the invention relates to the process of injecting the UMB and surfactant-containing foam into the formation. The surfactant-stabilized foam may be prepared and injected as is known in the art, with the addition that UMB are also injected. The surfactant containing foam may be injected as a preformed foam or by sequential injections of surfactant solution and gas. The UMB may be injected before, after or with the foam. Preferably the UMB are mixed with foam and the mixture injected. Alternatively the UMB could be mixed with surfactant solution and alternate injections of UMB/surfactant solution and gas made. However, when UMB are premixed with surfactant solution or surfactant containing foam, then injection must take place before any significant resuscitation of the UMB can take place.

UMB-producing surfactant-degrading bacterial cultures which can tolerate different formation conditions can be developed. Particular conditions that are important are formation temperature and salinity. The appropriate concentration of surfactant may also be varied, depending on these conditions.

A surfactant concentration which is sensitive to provide as large a change in surface tension with as little degradation as possible is desired. Surfactants lower the surface tension of water. As more surfactant is added, the surface tension drops lower. This continues until the critical micellular concentration (CMC) of the surfactant is reached. If surfactant in excess of the CMC is added, the surface tension is unaffected. Thus, a surfactant concentration which is less than the CMC should be selected, so that small changes in surfactant concentration due to bacterial degradation will effect surface tension.

The bacteria may preferably be originally taken from populations indigenous to the targeted formation. This may reduce environmental concerns. More preferably, they may be taken from a formation where the surfactant of interest has been used in the past.

The bacteria used preferably will be a variety which produce exopolymer and form a biofilm. Produced biofilm will add to the plugging effect of the foam. Some specific species which may be used include Pseudomonas Klebsiella, Enterobacter, Bacillus and Serratia species. Mixed cultures are preferred as they may grow more rapidly, and if one species dies, others may remain.

The bacteria used preferably form UMB which will revive to vegetative state due to the presence of the surfactant in the injected foam. However bacteria that form UMB which require nutrients in addition to surfactant to revive may also be used. In this case the additional nutrients will be injected into the formation either along with the foam or separately from it, to revive the UMB. If additional nutrients are used, preferably they will be chemically defined nutrients which will revive the UMB slowly. Rich nutrients lead to rapid resuscitation and may cause skin plugging. A nutrient which may be used to avoid skin plugging is trisodium citrate.

Any surfactant which is foam forming and for which a bacterial strain may be selected to degrade it may be used. However, particular surfactants of interest include various sulphonates and phosphates. Petroleum sulphonate, produced by the reaction of sulphuric acid with petroleum by-products, is one example, and is available from Witco Canada Inc., of Calgary, Alberta.

By "degradation" of surfactant, it is meant to include any action by the bacteria or their products on enough of the surfactant that the surface tension of the surfactant-containing foam will rise sufficiently to effectively plug the formation. This would include simple disruption of the polar moieties of the surfactant, or any other action with that effect.

BRIEF DESCRIPTION OF THE DRAWINGS

FIG. 3 is a graph showing percent permeability with time of a Berea sandstone core injected with UMB and surfactant; and FIG. 4 is a graph showing percent permeability with time of a Berea sandstone core injected with UMB.

DESCRIPTION OF THE PREFERRED EMBODIMENT

Briefly, bacterial cultures are isolated from a suitable source, such as oil well reservoir water or reservoir rock. A range of isolates may be obtained and assessed. Potential surfactant degraders of the surfactant of interest are then grown at $23°$ C.$+/-2°$ C. in a chemostat. The chemostat is modified to consist of a single reservoir containing the surfactant as the sole organic nutrient. Cultures are assessed for ability to grow in aerobic and anaerobic environments. Facultative cultures are selected and inoculated into a surfactant solution to assess growth, biodegradation and production of exopolysaccharides. Cultures which are viable, produce exopolymer and degrade surfactant are assessed for ability to form UMB of size less than about 0.4 $\mu$m under starvation conditions. The UMB are then assessed for ability to resuscitate to vegetative growth upon addition of surfactant or surfactant and chemically defined nutrients. Finally, those cultures which may be successfully resuscitated are assessed to determine the range of temperature and salinity under which they may grow. The result is a library of cultures which are useful for the present invention under a range of conditions.

UMB from a culture produced as above are then mixed with a foam containing the surfactant which the culture is competent to degrade. The surfactant concentration should be less than the critical micellular concentration for the surfactant. The mixture is then injected into the target formation soon afterwards, allowing insufficient time before injection for any significant UMB resuscitation. The mixture should be injected less than about four hours after mixing. The surfactant lowers the surface tension of foam so that it may deeply penetrate the formation and form an initial plug. The UMB resuscitate in the presence of the surfactant in the formation and degrade enough of the surfactant to form a long-lasting plug. The long-lasting plug is enhanced by the production of exopolymer and biofilm by the culture.

EXAMPLE 1

Determination of CMC of Petroleum Sulphonate

Figure 1:
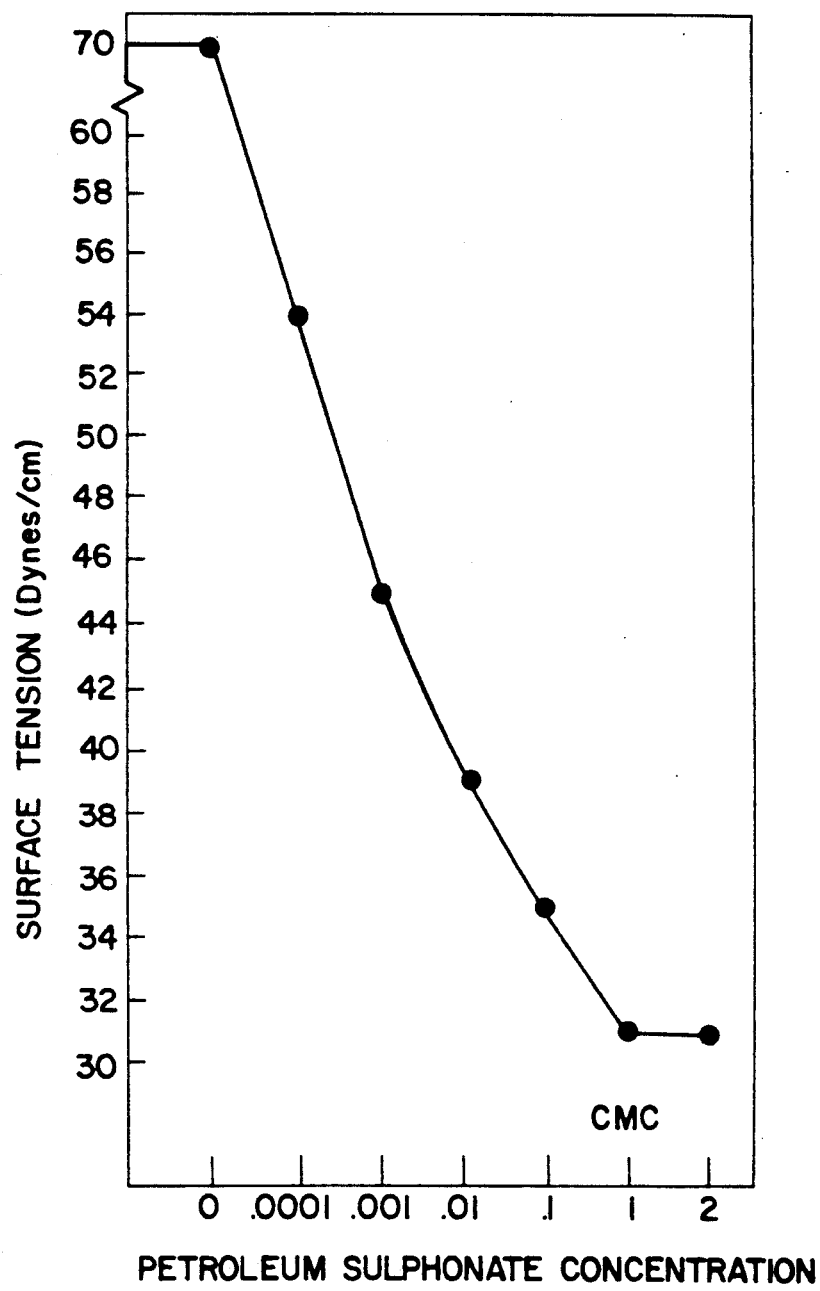
FIG. 1 is a graph showing concentration versus surface tension of petroleum sulphonate and determination of the CMC.

The critical micellular concentration (CMC) of Petroleum Sulphonate was determined, by adding varying concentrations of Petroleum Sulphonate to water and measuring the surface tension. Surface tension was measured using a Fisher Autotensionmat with a denoy ring. Results are shown in FIG. 1. The surface tension levelled off at Petroleum Sulphonate concentration of 1%, indicating that the CMC of Petroleum sulphonate is 1%. Therefore, concentrations of petroleum sulphonate below 1% were used in the following examples.

EXAMPLE 2

Isolation and Development of Cultures

Reservoir water and reservoir rock were obtained from a variety of oil formations in Alberta, Canada. The reservoir rocks were sonicated in water for 45 seconds to remove any cells from the rock surface. Samples of the reservoir water and reservoir rock supernatant were plated onto half strength brain heart infusion (BH1) agar plates, 1/10 BHI agar plates and 0.01% petroleum sulphonate surfactant agar plates, all plates containing 15% Difco Agar as the solidifying agent. The plates were incubated at room temperature and 60° C., both aerobically anaerobically. Colonies of differing morphology were picked off plates and transferred to new ½ BHI, 1/10 BHI and surfactant plates. The colonies picked from aerobically grown plates were grown anaerobically and the colonies picked from anaerobically grown plates were grown aerobically, to ensure cultures were facultative. The facultative anaerobes were identified by standard microbiological methods at Universite de Montreal, Service de diagnostic. Mixtures of the cultures were grown together in a Chemostat, consisting of a single reservoir containing 0.01% petroleum sulphonate in solution as the sole organic nutrient. The chemostat was sampled periodically to obtain isolates capable of growth on surfactant alone. Single and mixed cultures were added to flasks containing 0.01% Petroleum Sulphonate, and grown to $10^9$ cells/ml. A 2% (v/v) inoculum was added to flasks containing 0.01%. Petroleum Sulphonate. Growth was assessed by measuring optical density at 490 nm, and viable cell numbers by the spread plate technique. Degradation was assessed by increases in surface tension using a Denoy ring. Exopolymer production was assessed by carbohydrate assay, using the phenol sulphuric acid method Of Dubois, as described in M. Dubois et. al. "Colorimetric Method for Determination of Sugars and Related Substances," (1956) Anal. Chem. 28, 350–356. Mixed cultures exhibiting rapid growth, surfactant degradation and exopolymer production were chosen for the following examples.

Table 1 shows growth of various mixed cultures isolated as above in 0.1% petroleum sulphonate with time.

TABLE 1

Growth of surfactant in batch culture by various mixed isolates. OD = optical density at 490 nm. The control value of OD was 0.06.
0.1% Petroleum Sulphonate

| 1% inoculum in solution | 8 hr. OD | 24 hr. OD | 168 hr. OD |
|---|---|---|---|
| *Pseudomonas* sp. & *Klebsiella* sp. | .22 | .33 | 1.32 |
| *Pseudomonas* sp. & *Bacillus* sp. | .25 | .38 | 1.42 |
| *Bacillus* sp. & *Klebsiella* sp. | .22 | .33 | 1.42 |
| *Pseudomonas* sp., *Bacillus* sp. &. *Klebsiella* sp. | .25 | .38 | 1.42 |
| *Enterobacter* sp. & *Serratia liquefaciens* | .26 | .48 | 1.56 |

EXAMPLE 3

Surfactant Degradation and Bacterial Growth Within a Sand Pack

The mixed culture of Bacillus sp., Klebsiella sp. and Pseudomonas sp. isolated and identified in Example 2 was grown in a chemostat containing petroleum sulphonate in solution as the sole organic nutrient. The temperature was regulated by flowing water through the outer chamber.

In these examples, a Fisher Autotensiomat with a denoy ring was used to measure the surface tension of the various solutions. Surfactant degradation was indicated by an increase in surface tension of the solution. Viable cell counts were determined by the surface spread technique.

A sand pack was prepared by packing a core holder which measured 358 mm in length and 73 mm in diameter with 1.86 Kg of Kitscoty sand. The sand pack was saturated with brine followed by 0.5 pore volumes of a solution of 0.2% (v/v) petroleum sulphonate and the mixed bacterial culture (1% v/v) at a concentration of $1.25 \times 10^6$ CFU/ml. The experiment was performed at $23° +/-2°$ C. Effluent samples were taken for surface tension measurements and viable cell counts.

The results, as shown in Tables 1 and 2, indicate that bacterial growth occurred in the sand pack, as the viable cell count rose from $1.25 \times 10^6$ CFU/ml to $1.5 \times 10^8$ CFU/ml. Also, the surface tension rose from 29 dynes/cm to 67 dynes/cm, indicating that the surfactant was degraded.

TABLE 2

| | Viable Cells (CFU/ml) | | | |
|---|---|---|---|---|
| | 0 hr. | 24 hr. | 96 hr. | 168 hr. |
| Surfactant | $<1.0 \times 10^1$ | $<1.0 \times 10^1$ | $<1.0 \times 10^1$ | $<1.0 \times 10^1$ |
| Surfactant + bacteria | $1.25 \times 10^6$ | — | — | — |
| Effluent | — | $6.0 \times 10^6$ | $2.6 \times 10^7$ | $1.5 \times 10^8$ |

TABLE 3

| | Sandpack Core Surface Tension (dynes/cm) | | | |
|---|---|---|---|---|
| | 0 hr. | 24 hr. | 96 hr. | 168 hr. |
| Surfactant | 30 | 30 | 30 | 30 |
| Surfactant + bacteria | 29 | — | — | — |
| Effluent | — | 62 | 67 | 67 |

EXAMPLE 4

Surfactant Degradation and Plugging Within a Sandstone Core

The mixed culture of Enterobacter sp. and *Serratia liquefaciens* isolated and identified in Example 2 was developed for competency to degrade petroleum sulphonate in the same manner as described in Example 3.

A solution of 0.0001% petroleum sulphonate and the competent mixed culture ($3.4 \times 10^8$ cells/ml) was injected into a 400 milli-Darcy Berea sandstone core under a constant pressure of 1 psi. After 60 minutes. The core was injected with 0.001% petroleum sulphonate only. Effluent samples were collected for surface tension measurements and plugging rate. A control was performed by injecting surfactant only into the core.

Figure 2A:
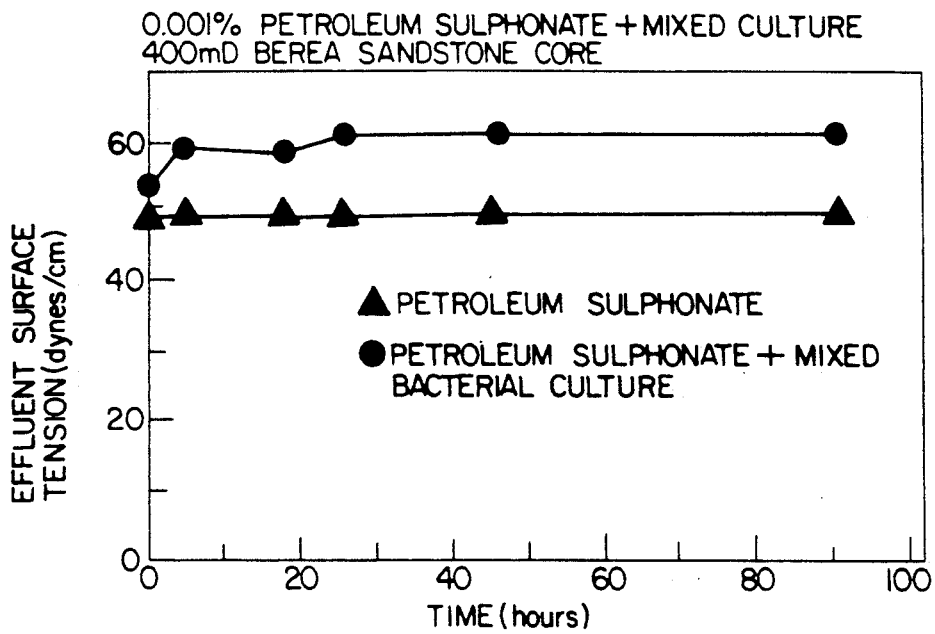
FIGS. 2A and 2B are graphs showing effluent surface tension and percent permeability with time of a Berea sandstone core injected with a mixed culture and a surfactant solution.
Figure 2B:
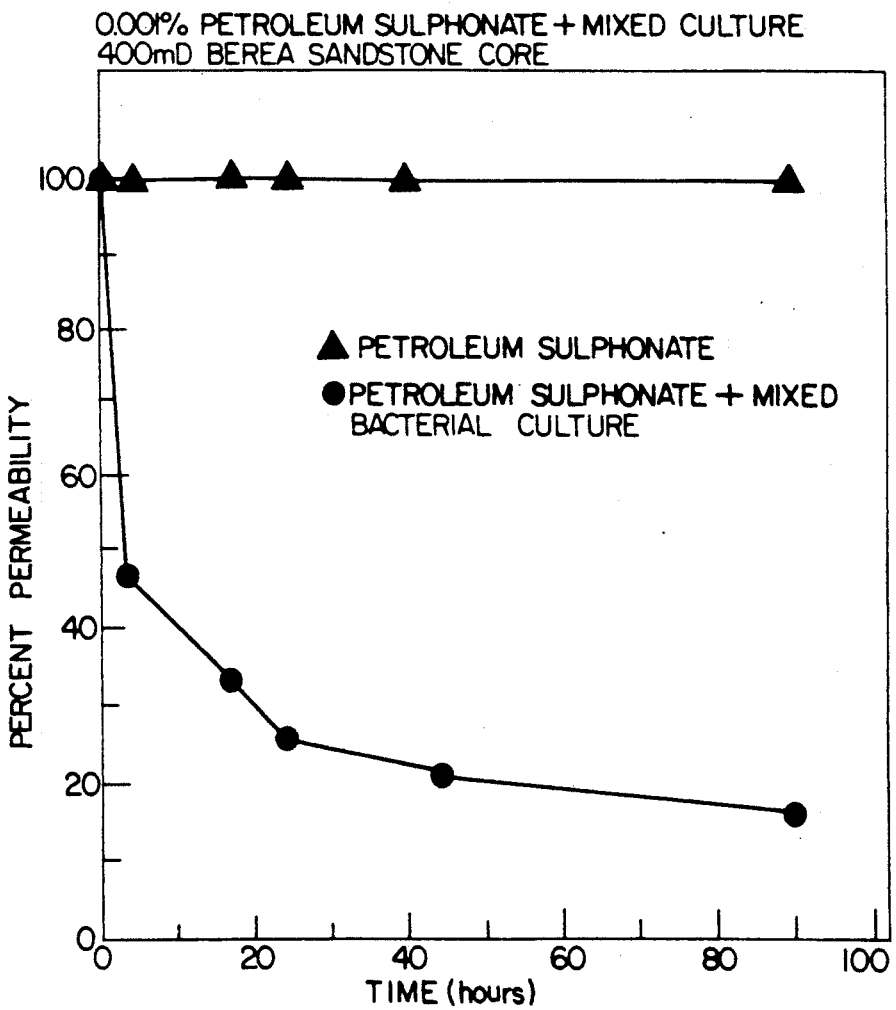

The results are shown in FIG. 2. The increase in surface tension above the control value of 48 dynes/cm indicates surfactant degradation. The decrease in permeability to less than 20% of the original permeability within 90 hours indicates plugging of the core has taken place.

EXAMPLE 5

Resuscitation of Surfactant-Degrading Ultramicrobacteria on Petroleum Sulphonate in a Sandstone Core and Subsequent Plugging The mixed bacterial culture of Enterobacter sp and *Serratia liquefaciens* from Example 4 was grown in petroleum sulphonate (0.001%) to stationary phase. The organisms were harvested by centrifugation ($10,000 \times g$, 15 min., $4°$ C.) and washed in sterile phosphate buffered saline (PBS) five times to eliminate any transfer of nutrients into the starvation media. The PBS contained (g/L distilled water), NaCl, 8.5; $KH_2PO_4$, 0.61; $K_2HPO_4$, 0.96; pH 7. The cells were re-suspended in a sterile PBS starvation media in acid-washed glassware. The starved cell suspension was stirred at $22°$ C. at 200 rev. $\min^{-1}$, for 2 weeks, until the cell sizes had reached a diameter of about 0.2 to 0.4 m as determined by direct light and electron microscopy. The UMB were filtered to remove any dead vegetative cells.

A solution of 0.001% petroleum sulphonate and the filtered mixed UMB ($2.3 \times 10^6$ cells/ml) were injected into a 400 milliDarcy Berea sandstone core under a constant pressure of 1.0 p.s.i. After 5 pore volumes, the core Was injected with 0.001% petroleum sulphonate only and was locked in. Effluent flow rates were monitored as a measure of core permeability. Decreases in permeability indicated resuscitation of the UMB to vegetative cells and subsequent plugging of the pore spaces. A decrease in permeability to approximately 30% of the original permeability was noted within 200 hours (FIG. 3).

As a control, the filtered mixed UMB ($2.3 \times 10^6$ cells/ml) were injected into a 400 milliDarcy Berea sandstone core under a constant pressure of 1.0 p.s.i., without addition of petroleum sulphonate. The results as shown in FIG. 4 indicate there was no significant decrease in permeability over 96 hours.

EXAMPLE 6

Halotolerance and Thermotoleranoe of the Surfactant-Degrading Mixed Culture

The surfactant-degrading strains must be able to survive over a wide variety of salinities and temperatures to be of most use in environmental applications. Halotolerance of the mixed culture in Examples 4 and 5 was tested by adding a 2% inoculum of the mixed vegetative cell culture ($8.0 \times 10^8$ cells/ml) into flasks of ½ BHI medium (half strength Brain Heart Infusion medium), with a NaCl concentration of 0, 2.5, 5, 7.5, 10, 12.5 or 15% w/v. Viable cell count data were obtained by plating cells onto ½ BHI plates and incubating at $23° +/- 2°$ C. for 24 hours. The two species were equally represented on the plates over the range of salinities tested (Table 3).

Thermotolerance was tested by adding a 2% inoculum of the mixed vegetative cell culture ($8.0 \times 10^8$ cells/ml) into flasks of ½ BHI medium, and incubating for 24 hours at temperatures of 4, 21, 37 and $60°$ C. Viable cell counts data were obtained for the above, by the spread plate technique. The two species were again equally represented on the plates over the range of temperatures tested (Table 4).

The results show that the mixed culture grows well over a wide range of salt concentration and temperatures. Halotolerance at least up to 15% NaCl was noted, and the culture was thermotolerant up to $37°$ C., with some growth at $60°$ C.

TABLE 4

| HALOTOLERANCE | |
|---|---|
| % NaCl (w/v) | Viable Cell Counts (CFU/ml) |
| 0 | $3.2 \times 10^6$ |
| 2.5 | $5.0 \times 10^7$ |
| 5.0 | $2.5 \times 10^7$ |
| 7.5 | $1.7 \times 10^7$ |
| 10.0 | $2.7 \times 10^7$ |
| 12.5 | $2.6 \times 10^7$ |
| 15.0 | $1.2 \times 10^8$ |

TABLE 5

| THERMOTOLERANCE | |
|---|---|
| Temperature (°C.) | Viable Cell Counts (CFU/ml) |
| 4 | $1.2 \times 10^5$ |
| 21 | $2.5 \times 10^7$ |
| 37 | $5.0 \times 10^7$ |
| 60 | $1.0 \times 10^3$ |

APPLICATIONS

While the inventors believe that the present invention may be used to reduce the permeability of any desired formation, they foresee particular applications.

One proposed application is in water flooding in oil production. As mentioned above, in the course of some secondary oil recovery operations, water is injected through an injection well to sweep or drive oil towards an adjacent production well. The present invention may be used to prevent fingering, which occurs when water channels preferentially through the most permeable zones.

One way this could be done is:

when water breaks through to the producing well, foam containing surfactant and UMB would be injected at the injection well;

preferably this would be followed by an injection of water, to push the foam a desired distance along the flood path;

it is left an appropriate period of time to allow the UMB to revive, and the cells to digest the surfactant;

then water flooding would be recommenced.

Another proposed application, also in the oil industry, is in the prevention of water coning. As mentioned above, water present in a stratum underlying an oil zone can cone upwardly into an oil well bore, thus excluding the oil from the well bore. The present invention can be used to reduce the permeability of the formation to avoid water coning. One way this could be done is:

once the well begins to produce water, foam containing surfactant and UMB would be injected;

preferably this would be followed by injection of some water, so that the foam will not plug any of the well perforations;

it would be left an appropriate period of time to allow the UMB to revive, and the cells to digest the surfactant;

then production from the well would be recommenced.

Further proposed applications of the present invention include plugging formations in order to:

prevent seepage of salt water to wells producing potable water;

prevent seepage of leacheate from garbage dumps, waste tips or other disposal areas to water sources; and prevent seepage of water from water-retaining structures, and subsequent weakening of these structures.

The embodiments of the invention in which an exclusive property or privilege is claimed are defined as follows:

1. A process for plugging a permeable subterranean stratum which comprises:
   injecting ultramicrobacteria into the stratum, the ultramicrobacteria having diameter less than about 0.4 μm and being competent to degrade a surfactant upon resuscitation to the vegetative state under stratum conditions; and
   injecting a foam containing the surfactant into the stratum, the surfactant being operative to lower the surface tension of the foam bubbles so that the foam will penetrate the stratum;
   such that the ultramicrobacteria will resuscitate to the vegetative state and degrade the surfactant to effectively plug the stratum.

2. The process as set forth in claim 1 in which the process is for microbially enhanced oil recovery and the stratum is a permeable zone in a oil-producing formation.

3. The process as set forth in claim 1 in which a nutrient solution adapted to substantially uniformly resuscitate the ultramicrobacteria to the vegetative state is also injected.

4. The process as set forth in claim 1 in which ultramicrobacteria are selected which are produced from bacteria which have the characteristic that they produce expolysaccharide biofilm in the vegetative state.

5. The process as set forth in claim 1 in which the surfactant is petroleum sulphonate.

6. The process as set forth in claim 5 in which the bacteria are a culture comprising one or more species of Enterobacter, Serratia, Bacillus, Klabsiella, or Pseudomonas.

7. The process as set forth in claim 1 in which the ultramicrobacteria are prepared from a culture comprising one or more species of Enterobacter, Serratia, Bacillus, Klebsiella, or Pseudomonas.

8. A process for plugging a permeable subterranean stratum which comprises:
   isolating bacteria from stratum waters;
   developing competency to degrade a surfactant by growing the bacteria with the surfactant present as the sole organic nutrient;
   starving the resulting competent bacteria until the cells reach a diameter less than about 0.4 μm;
   injecting the produced ultramicrobacteria into the stratum; and
   injecting a foam containing the surfactant into the stratum, the surfactant being operative to lower the surface tension of the foam bubbles so that the foam will penetrate the stratum;
   such that the ultramicrobacteria will resuscitate to the vegetative state and degrade the surfactant to effectively plug the stratum.

9. The process as set forth in claim 8 in which bacteria are selected from those isolated from the stratum waters which produce expolysaccharide biofilm in the vegetative state.

10. The process as set forth in claim 8 in which the bacteria are a culture comprising one or more species of Enterobacter, Serratia, Bacillus, Klabsiella, or Pseudomonas.

11. The process as set forth in claim 8 in which the process is for microbially enhanced oil recovery and the stratum is a permeable zone in a oil-producing formation.

12. The process as set forth in claim 8 in which a nutrient solution adapted to substantially uniformly resuscitate the ultramicrobacteria to the vegetative state is also injected.

13. The process as set forth in claim 8 in which the surfactant is petroleum sulphonate.

14. The process as set forth in claim 13 in which the bacteria are a culture comprising one or more species of Enterobacter, Serratia, Bacillus, Klabsiella, or Pseudomonas.

15. A process for microbially enhanced oil recovery for plugging permeable subterranean strata in an oil-producing formation, which comprises:
   isolating bacteria which produce expolysaccharide biofilm from formation waters;
   developing competency to degrade the surfactant petroleum sulphonate by growing the bacteria with said surfactant present as the sole organic nutrient;
   starving the resulting competent bacteria until the cells reach a diameter less than about 0.4 μm;
   mixing the produced ultramicrobacteria with a foam containing said surfactant; and
   injecting the mixture into the formation before resuscitation of appreciable numbers of the UMB can take place;
   such that the ultramicrobacteria will resuscitate to the vegetative state and degrade enough of said surfactant to effectively plug the permeable strata together with the biofilm produced by the vegetative cells.

* * * * *